Aug. 8, 1944.  C. A. RAABE  2,355,238
MACHINE FOR COAXIAL CABLE INSULATION
Filed Oct. 15, 1942  3 Sheets-Sheet 1

Inventor:
Carl A. Raabe.
By Lee J. Gary
Attorney

Aug. 8, 1944.    C. A. RAABE    2,355,238
MACHINE FOR COAXIAL CABLE INSULATION
Filed Oct. 15, 1942    3 Sheets-Sheet 3

Inventor:
Carl A. Raabe
By Lee J. Gary
Attorney

Patented Aug. 8, 1944

2,355,238

UNITED STATES PATENT OFFICE 2,355,238

MACHINE FOR COAXIAL CABLE INSULATION

Carl A. Raabe, Chicago, Ill.

Application October 15, 1942, Serial No. 462,203

4 Claims. (Cl. 29—203)

The present invention is directed to a novel machine for facilitating the stringing of insulating beads on electrical conductor wires. As is well known, insulation of this type is highly desirable for certain uses, particularly where substantial flexibility is required, or where the conductor wire must be bent to a relatively small radius. Bead type insulations on electrical conductor wires may be utilized in coaxial cables, wherein the inner conductor wire is encased in a series of abutting beads of insulating material and around which insulating beads is disposed, a tubular form of conductor element constituting the second electrical conductor. The thus assembled conductors are in turn encased in suitable insulation to constitute a cable. Conductor wires provided with bead type insulation are also widely used in other forms than coaxial cable, as is well understood in the art.

Heretofore, in making up substantial lengths of electrical conductor wire with insulated beads thereon, it has usually been found relatively expensive and time consuming. One of the common methods heretofore employed in stringing insulated beads on conductor wires, consisted in arranging the length of the conductor wire in a sinuous form around spaced apart pulleys, to dispose a plurality of sections of wire in vertically spaced apart tier form. When a suitable length of the free end of the wire has been covered with beads, say 6 or 8 feet in length, the beads are shoved along the wire, around and over the pulleys, until they are lodged at the extreme opposite end of the wire. This process of shifting such accumulations of beads along the wire is repeated continuously until the entire length of the wire is covered by the insulating beads.

The apparatus heretofore employed in the making up of conductor wire of this type requires considerable floor space, and frequently due to the size wire used necessitates limiting the length of the respective sections of the wire arranged in tier form so as to avoid imposing undue strain on the wire which may result in causing breakage thereof. By virtue of such apparatus the length of the wire to be covered by the insulating beads is necessarily limited, and it has not been found convenient and practical to string the beads over a wire of more than five or six hundred feet in length.

The machine constituting the present invention, now for the first time makes it possible to conveniently and practically string insulating beads on electrical conductor wires of several thousand feet in length. For certain uses it is well recognized that it is highly desirable that such insulating type of conductor wires be formed as a continuous or single cable, and up to the present time it has not been possible to make up such wires of a desired and necessary length.

One of the objects of the present invention is to provide a novel machine of the character indicated which is constructed and arranged for facilitating the stringing of insulating beads on relatively long lengths of conductor wires.

Another object is to provide an improved machine of the character indicated which is relatively simple, compact and which occupies a minimum amount of floor space.

A further object is to provide an improved machine of the character indicated by virtue of which it is possible to obtain rapid stringing of insulating beads on long lengths of electrical conductor wires in a manner which results in a substantial saving in both labor and cost of manufacture.

Still another object of this invention is to provide a novel machine for and an improved method of stringing insulating beads on relatively long lengths of electrical conductor wires.

Other objects and advantages of this invention will be apparent from the following description taken in connection with the accompanying drawings in which.

Figure 1:
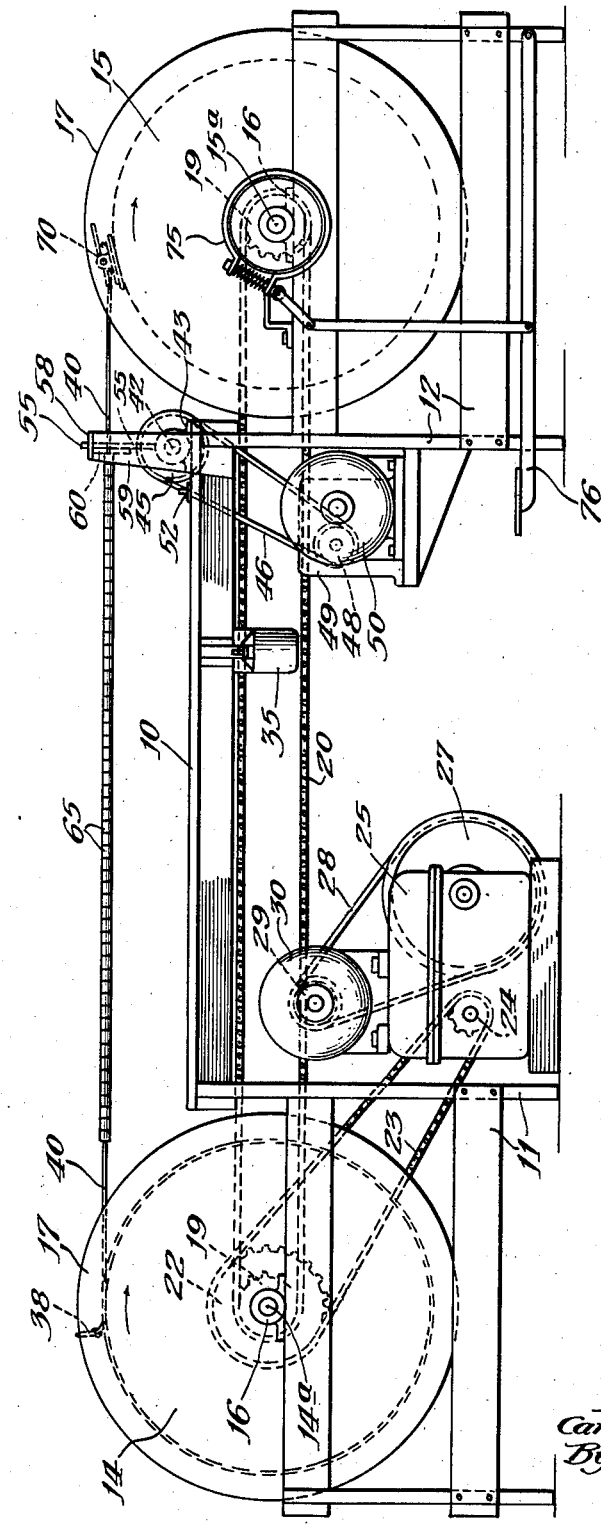
Fig. 1 is a diagrammatic view of my novel machine, embodying the present invention, shown in side elevation.
Figure 2:
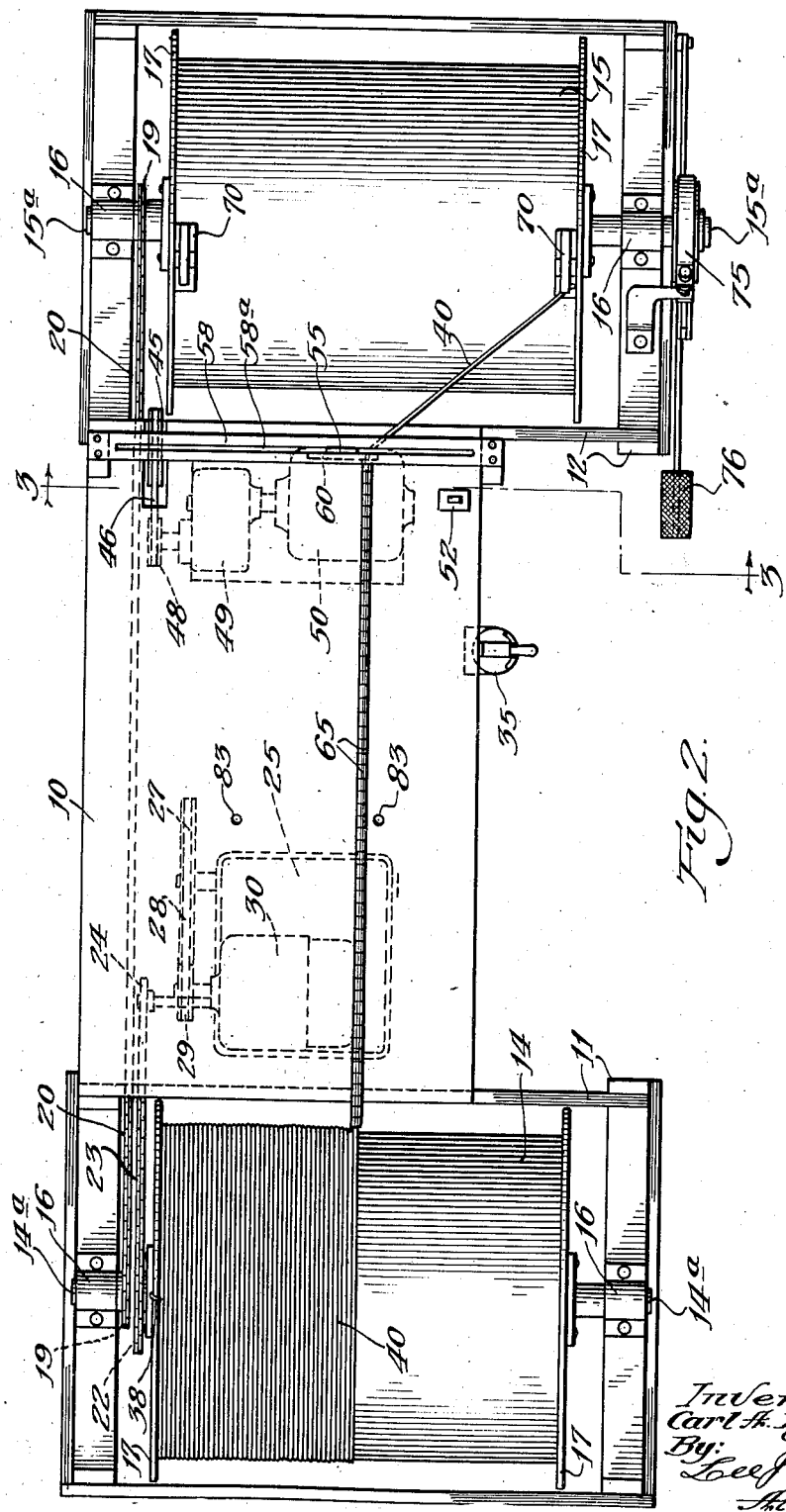
Fig. 2 is a diagrammatic plan view of the machine.

In the drawings, I have shown merely for purpose of illustration, my novel machine as it may be used in the process of stringing beads on a one conductor wire. It will be understood that due to the construction of the machine, as will hereinafter be described, it is possible that two separate lengths of conductor wire may be simultaneously operated upon in stringing insulating beads thereon.

The machine includes a convenient height work bench or table 10, connected at opposite ends to suitable framing 11 and 12, in which there is journal supported relatively large size drums indicated at 14 and 15 respectively, mounted for rotation about horizontal axes. These drums are provided at opposite ends with suitable stub shafts 14a and 15a, journalled in suitable bearings 16 carried by the frames 11 and 12. As a typical example of a practical sized drum to be employed it may be understood that the drums as illustrated are approximately four feet in external diameter, and having a face of approximately five feet. The opposite ends of the respective drums are provided with end flanges 17, which serve to guide the wire onto and off of the drums and for confining it in position thereon as well as serving as a convenient means for anchorage of the ends of the conductor wires. Corresponding stub shafts 14a and 15a, at one side of the machine, are provided with similar sprocket wheels 19 around which is trained a chain 20 by virtue of which the two drums are interconnected so as to be simultaneously driven at the same speed and in the same direction.

The stub shaft 14a, carrying the sprocket wheel 19, is also provided with a larger sprocket wheel 22 around which is trained a chain 23 which is also trained around the driving sprocket wheel 24 which is directly connected to a speed reducing mechanism indicated at 25. The speed reducing mechanism may be understood to be of a variable speed type, having appropriate manually operated controls (not shown), for varying the speed of rotation of the sprocket wheel 24 and by which the speed of rotation of the two drums 14 and 15 may be correspondingly varied.

The in-put end of the speed reducer 25 includes a driven wheel 27 which is driven by means of a belt 28 from the pulley wheel 29 on the end of the motor shaft of the motor indicated at 30.

In the use of the machine constituting the present invention it is desirable that the drums 14 and 15 be rotated intermittently under the direct control of the operator and for this purpose a two way switch indicated at 35 is employed. It is to be understood that the switch 35, which is represented diagrammatically, is connected by suitable conductor wires (not shown) to the motor so that the motor may be driven in either direction and by virtue of which the two drums 14 and 15 may likewise be driven simultaneously in either direction.

The conductor wire, to be insulated, herein indicated at 40, is initially wound for substantially its full length around the drum 14, except for a short convenient length at the free end, about eight or ten feet, which is adapted to be disposed freely upon the surface of the work bench 10. The opposite end of the wire, preparatory to winding around drum 14 is first secured to one of the flanges 17 of the drum 14, in any suitable manner, such as by anchoring the end of the wire as indicated at 38, through an aperture in the adjacent flange.

Figure 3:
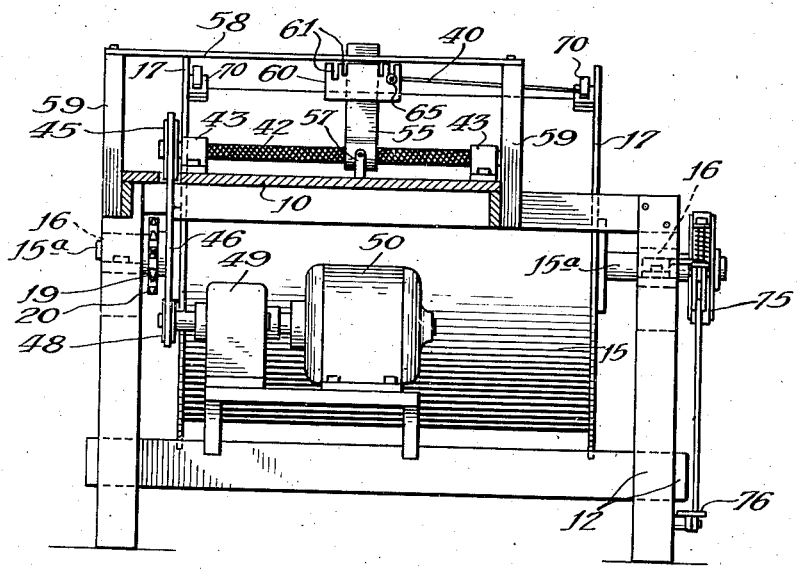
Fig. 3 is a transverse vertical section through the machine, taken as indicated at line 3—3 of Fig. 2.

At the end of the work bench or table 10, immediately adjacent the drum 15 is disposed a combination guide and traverse mechanism for controlling the conductor wire 40 in paying onto and off of the the drum 15, as will be hereinafter described. The traverse includes a screw 42, formed with a pair of oppositely extending threads as is well understood in the art, said screw extending horizontally in closed spaced relation to the top of the table 10 and having its opposite ends journalled in bearings 43. One end of the screw projects beyond the end of one of the bearings and is provided with a sprocket wheel 45 around which is trained a chain 46, passing downwardly through an opening in the table top and trained around a sprocket 48, associated with a speed reducing mechanism 49, directly connected to an electric motor indicated at 50. As will be hereinafter described, the traverse mechanism is only intermittently operated and, hence, a convenient hand switch indicated at 52 for controlling the motor 50, is disposed at one end of the table for manipulation by the operator. Mounted on the screw 42 is an upwardly extending carrier 55, the lower end of which is formed with suitable internal projections or threads for meshing with the threads of the screw 42, said projections being subject to the control of a manually adjustable handle 57, which as shown in Fig. 3 of the drawings is in neutral position. Said handle may be swung to one side or the other for causing the internal projections of the carrier to engage respectively in either of the two sets of threads of the screw 42. Therefore, since the screw 42 will be caused to rotate in only one direction, it is possible by the adjustment of the handle 57 to cause the traverse 55 to move toward either one end or the other end of the screw as may be desired. The upper end of the traverse is guided for transverse movement in a slot 58a formed in a bar 58 connected to the upper ends of a pair of uprights 59 carried on an adjacent end of the table 10.

Connected to the upper portion of the traverse 55 is a plate 60 provided with a multiplicity of upwardly open slots 61. For convenience in use of the machine it may be understood that said slots are formed in two series of various widths for accommodating different sizes of electrical conductor wires, and the slots of the respective series are preferably formed in multiples of two of the same size so that if desired two separate lengths of conductor wire of the same size may be simultaneously operated upon.

Figure 4:
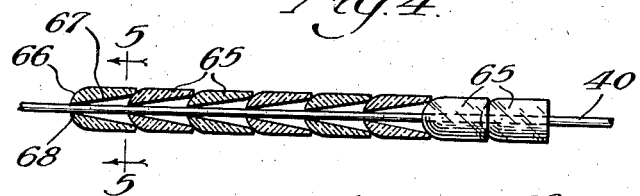
Fig. 4 is a view of a fragmentary portion of a conductor wire covered with insulating beads, with some of the beads being shown in section.
Figure 5:
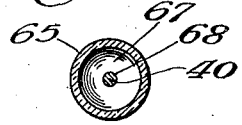
Fig. 5 is a transverse section through the insulated conductor wire, taken at line 5—5 of Fig. 4.

It is to be understood that the insulating beads employed may be of various size and contour, and as represented in Fig. 4 said beads 65 are of substantially cylindrical form, rounded at one end, as indicated at 66, and are each provided with a relatively large generally frusto-conical cavity 67, terminating in a large opening at the other end. The closed end of each of the beads is provided with an axial opening 68, substantially the size of the wire upon which they are to be strung. The rounded closed end of each bead is adapted to be seated telescopically in the recess opening 67 of the next adjacent bead. Such an arrangement provides for freedom of movement of one bead relatively to the next adjacent bead, and as a whole provides adequate flexibility for the entire electrical conductor wire covered by such beads without at any time causing movement of one bead relatively to the next adjacent bead so as to expose the conductor wire 40 between adjacent beads. Thus complete insulation for the conductor wire 40 is maintained at all times.

As above stated the machine as illustrated is capable of use for simultaneously stringing beads on two separate lengths of conductor wire, in which case an operator would stand on opposite sides of the table 10, with the respective lengths of the conductor wires wrapped around opposite end portions of the drum 14, leaving a terminal portion of convenient length, say of 10 feet of each wire, free to rest upon the table 10. The operator or operators then string on to the free portion of the conductor wires a sufficient length of the insulated bead 65 until said portion thereof becomes filled and the beads abut against the surface of the drum 14. When such a portion of the conductor wire is filled with beads the operators then tend to force the beads along the adjacent portion of the wires constituting the next adjacent convolution wrapped around the drum 14, and the extreme free end of the wires is then seated in appropriate slots 61 of the traverse plate 60, and the terminal end of each wire is fastened in the adjacent one of the spring pressed hand clamps indicated at 70, or both wires may be fastened in one of said clamps, mounted on the inner face of the end flanges 17 of the drum 15.

The control 57 of the traverse is adjusted and the respective switches 35 and 52 are then manipulated to close the circuits and drive the motors 30 and 50, which cause the drums 14 and 15 to rotate in the same clockwise direction as indicated by the arrows in Fig. 1. The beads 65 on the conductor wires abut against the plate 60, while the wire passes therethrough and is paid onto the drum 15. The machine continues to operate until substantially the entire lengths of the conductor wires are unwrapped from the drum 14 and are wrapped on the drum 15, during which time the traverse 55, has been caused to move along the screw 42, to properly space the convolutions of the wires across the face of the drum 15. As the fixed ends 38 of the conductor wires 40 are approached, the switches 35 and 52 are opened to arrest the motors 30 and 50. To insure no appreciable over-running of the drums, the operator may manipulate the foot brake indicated at 75, having a foot treadle 76 which retards and brakes the speed of the drum 15, and which through the drive connection made by the chain 20, simultaneously retards or brakes the speed of the drum 14. The beads 65, due to abutment against the plate 60, will be disposed on sections of the wires, adjacent the other extreme or fixed end portions thereof. The operators then push the section of beads along the wires until they cover the extreme end portions thereof. The switch 35 is then reversed and control handle 57 of the traverse is reversed and switch 52 closed, to complete circuits to the motors 30 and 50. The drums 14 and 15 now rotate in counterclockwise direction and the conductor wires are wound off of drum 15 and wrapped around drum 14 until substantially the entire lengths of the wires are wound around the drum 14, with the exception of a terminal portion of 8 or 10 feet in length, which is again left free upon the table 10 for repeating the bead stringing operation. During such unwinding operation the traverse 55 serves as a guide for the wires as they are paid off of the drum 15. It is to be understood, of course, that when the drum 14 has substantially all the wire paid thereon, the switches 35 and 52 are opened, and the foot brake 75 operated so that the drums may be arrested at a proper time to permit release of the terminal ends of the wires from the clamps 70 on the drum 15, without imposing strain upon the wires.

The terminal portions of the wires are again covered with insulating beads and the machine is again operated as above described to cause the new sections of beads to become lodged in abutting relation against the previously assembled section of beads. Thus operation is repeated until eventually the entire length of the wires becomes covered with the beads. It will be apparent that during the continuous operation of stringing and assembling of the beads the amount of wire necessary to be unwound from the drum 14 onto the drum 145 gradually diminishes, it being necessary only to unwind the portion of the wire which has not been covered by the beads.

The purpose of the variable speed reducing mechanism 25 is to control the speed of rotation of the drums 14 and 15. This is important when stringing beads on conductor wires of different sizes. When relatively fine or small size wire is employed, there is a substantial possibility of breakage and, hence, undue strain on the wire must be reduced to a minimum. In this connection it is sometimes desirable to relieve the frictional strain imposed on the wires by the beads due to their abutment against the traverse plate 60 and for this purpose the operator may grasp by his hand an intermediate section of the beads which are arrested by abutment with the plate 60, during the period that the wire is passing therethrough and is being paid onto the drum 15.

Figure 6:
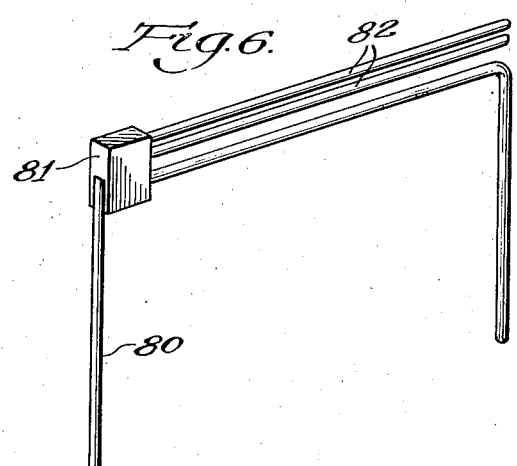
Fig. 6 is a perspective view of an auxiliary guide adapted to be used in conjunction with the machine when relatively small size conductor wire is employed so as to reduce the strain imposed upon the wire during the process of moving a multiplicity of beads along the wire.

If desired when relatively fine wire is employed an auxiliary guide and abutment as represented in Fig. 6 of the drawings may be utilized. This auxiliary guide is in the form of an inverted U-shaped frame 80, provided at one of the upper corners wiht a block 81, from which extends a pair of relatively closely spaced apart horizontally extending rods 82, it being understood that the space between the rods being sufficient to accommodate relatively small size wires. The legs of the frame 80 may be fitted in sockets indicated at 83, formed in the top of the table 10, and the wires may be passed into the slot formed by the two rods 82 so that a portion of the section of strung beads may be caused to abut against the rods 82 while the other portion of the string of beads is permitted to abut against the plate 60. Thus the frictional strain on the beads during the time that the wire is being passed therethrough, in the passing of the wire onto the drum 15, is greatly relieved.

It will be apparent that my novel machine greatly facilitates the operation of stringing of insulating beads on long lengths of conductor wires. Such a machine now makes it possible to string beads on wires of several thousands of feet in length, the length of the wires of course being limited only to the extent of convenient wrapping around and accommodation on the drums 14 and 15. When the wires have been completely covered by the insulating beads they may be conveniently removed from the drums and wrapped on to a flanged roll of smaller size for convenient use in connection with apparatus for the assembly in either coaxial cable or multiconductor cable as conditions may require.

Although I have shown and described a preferred embodiment of my invention, manifestly it is capable of modification and rearrangement of constructional features without departing from the spirit and scope thereof. I do not, therefore, wish to be understood as limiting this invention to the precise form herein disclosed, except as I may be so limited by the appended claims.

I claim as my invention:

1. In a machine of the character described, the combination of an elongated work table of convenient height, a pair of rotatable drums mounted on horizontal axes, transversely of the direction of length of the table, adjacent opposite ends of the table, one of said drums being adapted to have a substantial length of conductor wire wound thereon with a short end portion of said wire disposed freely on the table for stringing of insulated beads thereon in abutting relation, the other drum being adapted, after said portion of the wire is covered with beads, to have the terminal end of the wire connected thereto, manually controlled, reversible power driven mechanism operably connected to both said drums for simultaneously rotating them in the same directions, said drums during one direction of rotation causing the wire to be paid off said one drum and onto said other drum, and abutment means for restraining movement of said section of beads during winding of the wire onto said other drum, together with manually operated braking means for directly retarding rotation of said other drum and through said mechanism retarding rotation of said one drum when the driving of said power driven mechanism is interrupted.

2. In a machine of the character described, the combination of an elongated work table of convenient height, a pair of rotatable drums mounted on horizontal axes, transversely of the direction of length of the table, adjacent opposite ends of the table, one of said drums being adapted to have a substantial length of conductor wire wound thereon with a short end portion of said wire disposed freely on the table for stringing of insulated beads thereon in abutting relation, the other drum being adapted, after said portion of the wire is covered with beads, to have the terminal end of the wire connected thereto, manually controlled, reversible power driven mechanism operably connected to both said drums for simultaneously rotating them in the same direction, said drums during one direction of rotation causing the wire to be paid off said one drum and onto said other drum, and abutment means for restraining movement of said section of beads during winding of the wire onto said other drum, together with foot operated braking mechanism operably associated with said other drum for retarding rotation of said other drum and said one drum through said power driven mechanism.

3. In a machine of the character described, the combination of an elongated work table of convenient height, a pair of rotatable drums mounted on horizontal axes, transversely of the direction of length of the table, adjacent opposite ends of the table, one of said drums being adapted to have a substantial length of conductor wire wound thereon with a short end portion of said wire disposed freely on the table for stringing of insulated beads thereon in abutting relation, the other drum being adapted, after said portion of the wire is covered with beads, to have the terminal end of the wire connected thereto, power driven mechanism, adapted to be actuated under control of the operator, for rotating said other drum for causing the wire to be paid off of said one drum and onto said other drum, abutment means adapted for restraining movement of said section of beads during winding of the wire onto said other drum, whereby to lodge said section of beads adjacent the opposite end portion of the wire, said abutment means being mounted on the table adjacent said other drum and serving as a guide for feeding said wire onto said other drum, and power driven means including operating connections for moving said abutment means transversely of the face of the said other drum for transaxially spacing the convolutions of wire being wound thereon.

4. In a machine of the character described, the combination of an elongated work table of convenient height, a pair of rotatable drums mounted on horizontal axes, transversely of the direction of length of the table, adjacent opposite ends of the table, one of said drums being adapted to have a substantial length of conductor wire wound thereon with a short end portion of said wire disposed freely on the table for stringing of insulated beads thereon in abutting relation, the other drum being adapted, after said portion of the wire is covered with beads, to have the terminal end of the wire connected thereto, manually controlled, reversible power driven mechanism operably connected to said drums for simultaneously rotating them in the same directions, said drums during one direction of rotation causing the wire to be paid off said one drum and onto said other drum, abutment means for restraining movement of said section of beads during winding of the wire onto said other drum, said abutment means being mounted on the table adjacent said other drum and serving as a guide for feeding said wire onto said other drum, and power driven means including operating connections for moving said abutment means transversely of the face of the said other drum for transaxially spacing the convolutions of wire being wound thereon.

CARL A. RAABE.